US011286133B2

(12) United States Patent
Trcka et al.

(10) Patent No.: US 11,286,133 B2
(45) Date of Patent: Mar. 29, 2022

(54) ELEVATOR HEALTH MONITORING SYSTEM

(71) Applicant: OTIS ELEVATOR COMPANY, Farmington, CT (US)

(72) Inventors: Nikola Trcka, West Hartford, CT (US); Teems E. Lovett, Glastonbury, CT (US); Sandeep Sudi, Unionville, CT (US); Paul R. Braunwart, Hebron, CT (US); Sudarshan N. Koushik, West Hartford, CT (US); Peter Liaskas, Norwalk, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 933 days.

(21) Appl. No.: 16/030,117

(22) Filed: Jul. 9, 2018

(65) Prior Publication Data

US 2019/0010022 A1    Jan. 10, 2019

Related U.S. Application Data

(60) Provisional application No. 62/529,792, filed on Jul. 7, 2017.

(51) Int. Cl.
*B66B 5/00* (2006.01)
*G05B 13/02* (2006.01)
(Continued)

(52) U.S. Cl.
CPC .......... *B66B 5/0025* (2013.01); *B66B 1/3461* (2013.01); *B66B 5/0037* (2013.01);
(Continued)

(58) Field of Classification Search
CPC ......... B66C 13/02; B66D 1/52; B66F 11/048; B66F 5/04
See application file for complete search history.

(56) References Cited

U.S. PATENT DOCUMENTS 5,557,546 A    9/1996  Fukai et al.
5,760,350 A    6/1998  Pepin et al.
(Continued)

FOREIGN PATENT DOCUMENTS

CA         2820711 A1      6/2012
CN       101259930 A       9/2008
(Continued)

OTHER PUBLICATIONS

M. Murphy, The Lincoln Motor Company, Elevator Pitch: Listen to internet-connected elevators talk about how their day's going, Feb. 16, 2017, 12 Pages.
(Continued)

*Primary Examiner* — Jeffrey Donels
(74) *Attorney, Agent, or Firm* — Cantor Colburn LLP

(57) ABSTRACT

An elevator system includes a component adapted to perform a function, a sensor, and a control configuration. The sensor is configured to detect an operating parameter associated with the function. The control configuration is configured to receive a parameter signal from the sensor, and extract a predesignated feature from data associated with the parameter signal. The predesignated feature is then aggregated by the control configuration and machine learning is applied to determine a degradation level of the function associated with the predesignated feature.

3 Claims, 4 Drawing Sheets

(51) Int. Cl.
  *B66B 1/34* (2006.01)
  *B66B 13/06* (2006.01)
  *G05B 23/02* (2006.01)

(52) U.S. Cl.
  CPC .......... *B66B 13/06* (2013.01); *G05B 13/0265* (2013.01); *G05B 23/0283* (2013.01)

(56) References Cited

U.S. PATENT DOCUMENTS

| | | | |
|---|---|---|---|
| 6,173,814 | B1 | 1/2001 | Herkel et al. |
| 6,392,537 | B1 | 5/2002 | Tazumi et al. |
| 6,854,565 | B2 | 2/2005 | Peräläet et al. |
| 7,423,398 | B2 * | 9/2008 | Tyni ........................ B66B 13/00 318/432 |
| 7,484,598 | B2 | 2/2009 | Tyni et al. |
| 7,637,355 | B2 * | 12/2009 | Tyni ..................... B66B 13/143 187/315 |
| 7,823,706 | B2 | 11/2010 | Tyni et al. |
| 8,678,143 | B2 | 3/2014 | Bunter |
| 9,481,548 | B2 | 11/2016 | Siddiqui et al. |
| 9,604,818 | B2 * | 3/2017 | Kallioniemi .......... B66B 5/0025 |
| 10,196,236 | B2 * | 2/2019 | Sonnenmoser ....... B66B 5/0025 |
| 10,829,344 | B2 * | 11/2020 | Koushik ............... B66B 5/0025 |
| 2003/0217894 | A1 * | 11/2003 | Perala .................. B66B 5/0006 187/316 |
| 2012/0138391 | A1 | 6/2012 | Weinberger |
| 2014/0163759 | A1 | 6/2014 | Anderson et al. |
| 2015/0293799 | A1 | 10/2015 | Sekine et al. |
| 2016/0180610 | A1 | 6/2016 | Ganguli et al. |
| 2017/0029246 | A1 | 2/2017 | Kulak et al. |
| 2017/0158462 | A1 | 6/2017 | Roberts et al. |
| 2017/0247226 | A1 * | 8/2017 | Roberts ................. B66B 5/0025 |

FOREIGN PATENT DOCUMENTS

| | | |
|---|---|---|
| CN | 201538624 U | 8/2010 |
| CN | 201713169 U | 1/2011 |
| CN | 102701036 A | 10/2012 |
| CN | 102923538 A | 2/2013 |
| CN | 202729499 U | 2/2013 |
| CN | 103130057 A | 6/2013 |
| CN | 203112271 U | 8/2013 |
| CN | 103303758 A | 9/2013 |
| CN | 203187255 U | 9/2013 |
| CN | 103678877 A | 3/2014 |
| CN | 103910257 A | 7/2014 |
| CN | 104310135 A | 1/2015 |
| CN | 104444681 A | 3/2015 |
| CN | 104555627 A | 4/2015 |
| CN | 204265155 U | 4/2015 |
| CN | 104627769 A | 5/2015 |
| CN | 104692210 A | 6/2015 |
| CN | 104891290 A | 9/2015 |
| CN | 204778129 U | 11/2015 |
| CN | 105645209 A | 6/2016 |
| CN | 205312815 U | 6/2016 |
| CN | 105752787 A | 7/2016 |
| CN | 106044436 A | 10/2016 |
| CN | 205616385 U | 10/2016 |
| CN | 205709266 U | 11/2016 |
| CN | 106276449 A | 1/2017 |
| CN | 106335825 A | 1/2017 |
| CN | 106348113 A | 1/2017 |
| CN | 106429685 A | 2/2017 |
| CN | 106429689 A | 2/2017 |
| CN | 106516922 A | 3/2017 |
| CN | 206069114 U | 4/2017 |
| EP | 2604564 A1 | 6/2013 |
| EP | 3424861 A1 | 1/2019 |
| JP | H07257861 A | 10/1995 |
| JP | 2015035118 A | 2/2015 |
| JP | 5996153 A1 | 12/2017 |
| WO | 0236476 A1 | 5/2002 |
| WO | 2016040452 A1 | 3/2016 |
| WO | 2016051011 A1 | 4/2016 |
| WO | 2016091309 A1 | 6/2016 |
| WO | 2017098601 A1 | 6/2017 |

OTHER PUBLICATIONS

The Platform Lift Company; Machine Learning Maintenance & the Internet of Things; Apr. 4, 2015; 3 Pages.

Wen, P. et al. "Fault Prediction of Elevator Door System Based on PSO-BP Neural Network", Engineering, vol. 8, pp. 761-766.

Zhang, T. et al. "Elevator-Assisted Sensor Data collection for Structural Health Monitoring", IEEE Transactions on Mobile Computing, Oct. 2012, vol. 11, Issue: 10, 2 Pages.

C. Stedman, ed., TechTarget Network, IoT Agenda, "Evaluate: Predictive maintenance softwar points to amchinery problems", Copyright 2005-2017, 13 Pages.

Chinese Office Action for Application No. 201810741778.6 dated Oct. 9, 2019; 6 pages.

European Search Report for Application No. 18182311.3 dated Mar. 29, 2019; 10 pages.

\* cited by examiner

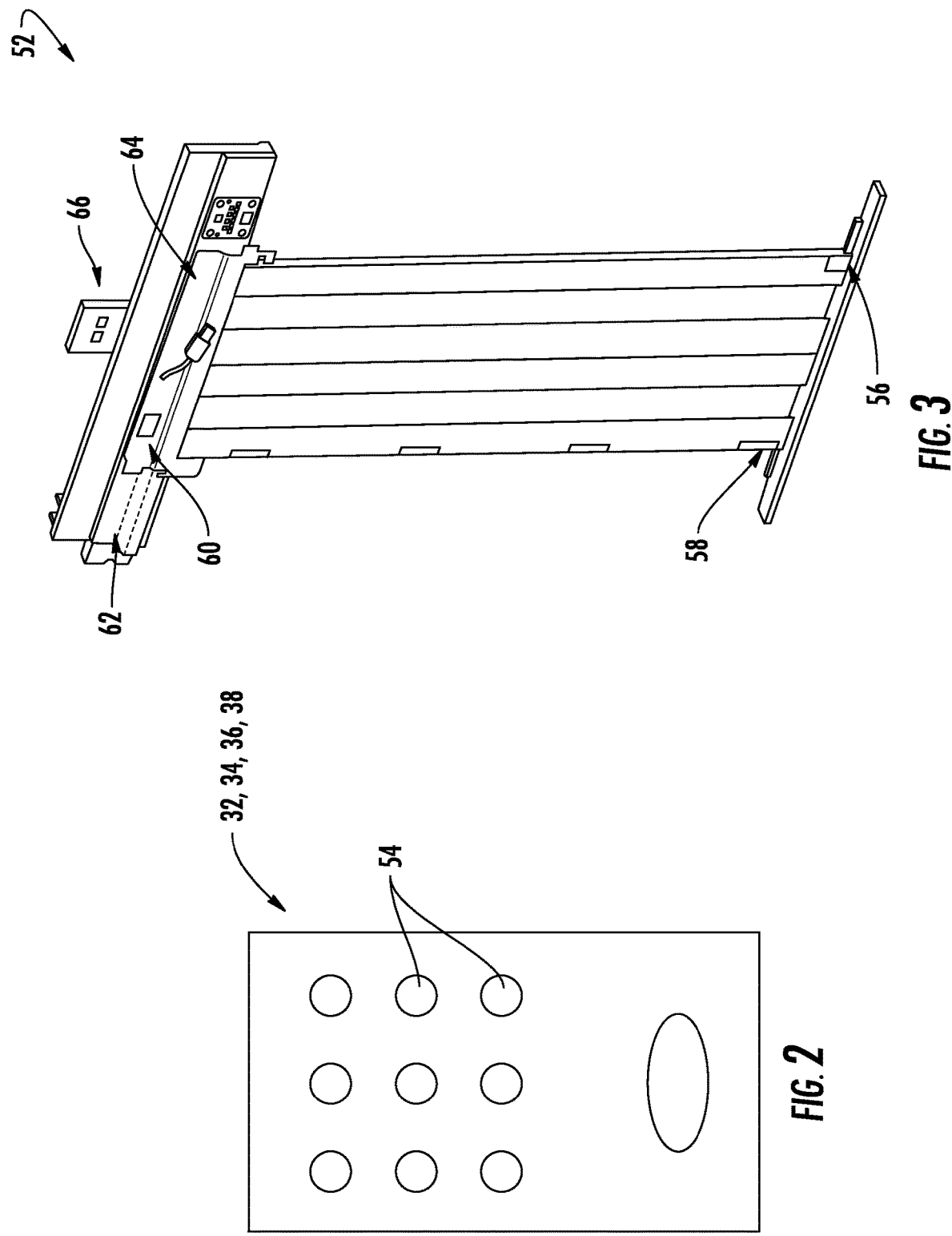

ELEVATOR HEALTH MONITORING SYSTEM

CROSS REFERENCE TO RELATED APPLICATIONS

This application claims the benefit of U.S. Provisional Application No. 62/529,792, filed Jul. 7, 2017, which is incorporated by reference in its entirety herein.

BACKGROUND

The present disclosure relates to an elevator system, and more particularly, to an elevator health monitoring system.

Elevator systems may include multiple cars operating in multiple hoistways. Each hoistway may be associated with multiple gates operating on multiple floors of a building. In general, the vast array of elevator components may make maintenance activity and component monitoring time consuming and cumbersome.

SUMMARY

An elevator system according to one, non-limiting, embodiment of the present disclosure includes a component adapted to perform a function; a sensor configured to detect an operating parameter associated with the function; and a control configuration configured to receive a parameter signal from the sensor; extract a predesignated feature from data associated with the parameter signal, aggregate the predesignated feature, and apply machine learning to determine a degradation level of the function associated with the predesignated feature.

Additionally to the foregoing embodiment, the elevator system includes a car adapted to travel in a hoistway, wherein the component includes a door assembly adapted to open and close for user access into and out of the car from and to a plurality of landings.

In the alternative or additionally thereto, in the foregoing embodiment, the door assembly includes a plurality of landing doors and the function is opening and closing of the plurality of landing doors, wherein the sensor is one of a plurality of sensors with each sensor located at a respective landing door of the plurality of landing doors.

In the alternative or additionally thereto, in the foregoing embodiment, the feature includes vibration.

In the alternative or additionally thereto, in the foregoing embodiment, the door assembly includes a car door supported by the car and the function is opening and closing the car door.

In the alternative or additionally thereto, in the foregoing embodiment, the feature includes vibration.

In the alternative or additionally thereto, in the foregoing embodiment, the elevator system includes a feature generation module executed by the control configuration for extracting the predesignated feature from the parameter signal.

In the alternative or additionally thereto, in the foregoing embodiment, the elevator system includes a fault detection module executed by the control configuration to analyze the predesignated feature and extract feature derivations from the predesignated feature indicative of abnormal operation.

In the alternative or additionally thereto, in the foregoing embodiment, the elevator system includes a fault classification module executed by the control configuration to classify the feature derivations into respective fault classes.

In the alternative or additionally thereto, in the foregoing embodiment, the elevator system includes a degradation estimation module executed by the control configuration to establish a learned degradation model.

In the alternative or additionally thereto, in the foregoing embodiment, the control configuration includes a local controller and a server, and the local controller is configured to execute the feature generation module and the server is configured to execute the fault classification module and the degradation estimation module.

In the alternative or additionally thereto, in the foregoing embodiment, the server is cloud-based.

In the alternative or additionally thereto, in the foregoing embodiment, the elevator system includes a sensor hub configured to receive the parameter signal; a mobile device configured to receive the parameter signal from the local controller, execute the feature generation module, execute the fault detection module, execute the fault classification module, and execute the degradation estimation module; and a cloud-based server configured to communicate with the mobile device and store the learned degradation model for use by the degradation estimation module.

In the alternative or additionally thereto, in the foregoing embodiment, the faults include at least one of a debris issue, roller degradation, door lock, and belt tension.

In the alternative or additionally thereto, in the foregoing embodiment, the sensor is at least one of a vibration sensor, a microphone, a velocity sensor, a position sensor, a current sensor, an accelerometer, and a pressure sensor.

An elevator health monitoring system utilizing at least one sensor of an elevator system according to another, non-limiting, embodiment includes at least one processor; at least one electronic storage medium; a feature generation module stored in one of the at least one electronic storage medium and executed by one of the at least one processor for extracting a predesignated feature from a parameter signal sent from the at least one sensor; and a fault detection module stored in one of the at least one electronic storage medium and executed by one of the at least one processor for analyzing the predesignated feature and extracting feature derivations from the predesignated feature indicative of abnormal operation.

Additionally to the foregoing embodiment, the elevator health monitoring system includes a fault classification module stored in one of the at least one electronic storage medium and executed by one of the at least one processor to classify the feature derivations into respective faults.

In the alternative or additionally thereto, in the foregoing embodiment, the elevator health monitoring system includes a degradation estimation module stored in one of the at least one electronic storage medium and executed by one of the at least one processor, wherein the degradation estimation module applies a learned degradation model stored in one of the at least one electronic storage mediums.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 2 is a front view of a call panel of the elevator system;

FIG. 3 is a perspective view of a door actuator assembly of the elevator system;

DETAILED DESCRIPTION

Figure 1:
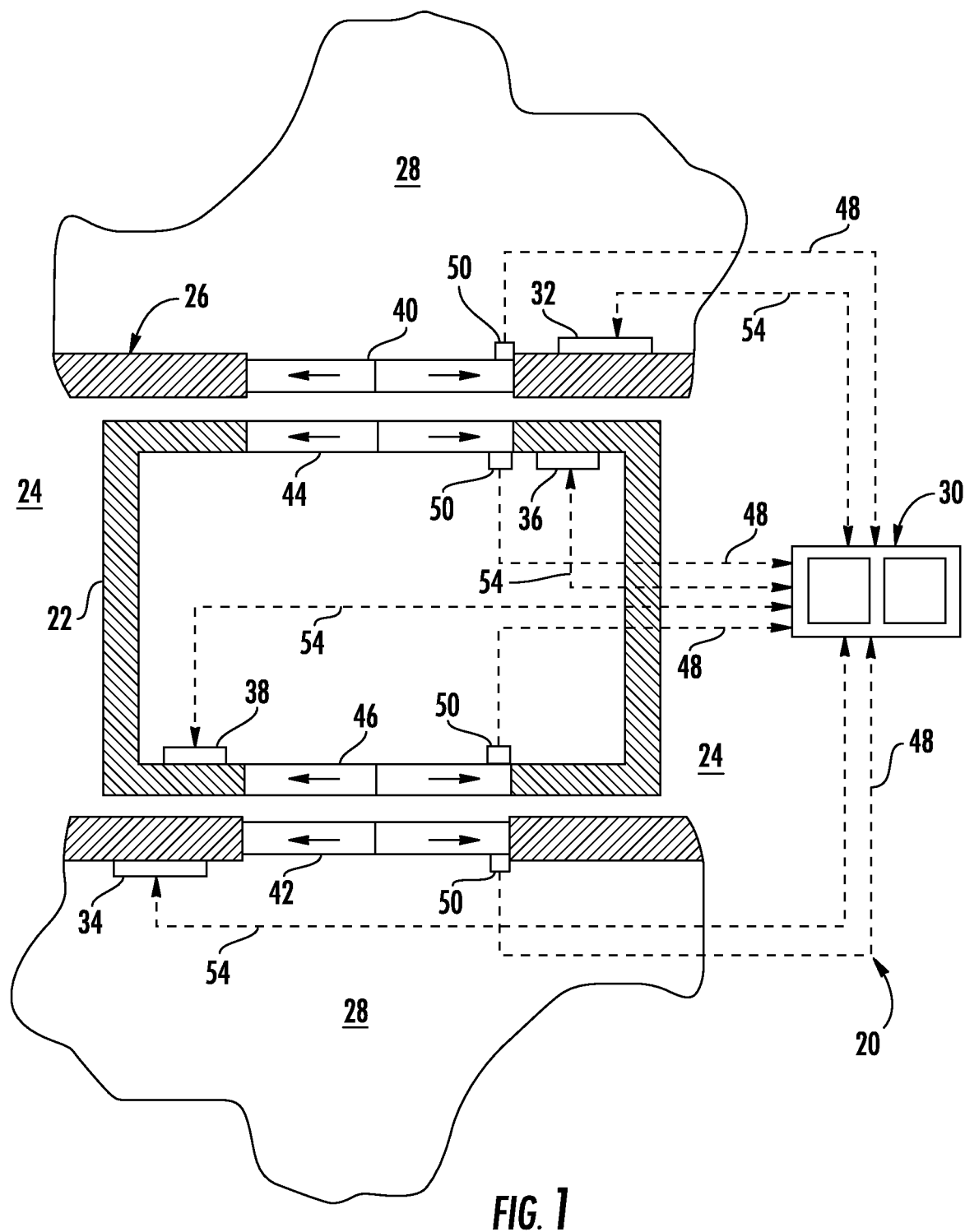
FIG. 1 is a schematic of an elevator system in an exemplary embodiment of the present disclosure.

Referring to FIG. 1, an exemplary embodiment of an elevator system 20 is illustrated. The elevator system 20 may include an elevator car 22 adapted to move within a hoistway 24 having boundaries defined by a structure or building 26, and between a multitude of floors or landings 28 of the building 26. The elevator system 20 may further include a control configuration 30 and a multitude of operating and/or moving components that may require maintenance and/or repair, and may be generally monitored and/or controlled by the control configuration 30. The components may include a plurality of call panels (four illustrated as 32, 34, 36, 38), at least one gate or landing door (i.e., two illustrated as 40, 42), at least one car door (i.e. two illustrated as 44, 46), and other components. The elevator car 22 is propelled by a component (i.e., propulsion system, not shown) that may be controlled by the control configuration 30 of the elevator system 20. Examples of a propulsion system may include self-propelled or ropeless (e.g., magnetic linear propulsion), roped, hydraulic, and other propulsion systems. It is further contemplated and understood that the hoistway 24 may extend, and thus the car 22 may travel, in a vertical direction, a horizontal direction, and/or a combination of both.

The landing doors 40, 42 may be located at opposite sides of the hoistway 24. In one example, the doors 40, 42 may be located on some floors 28 and only one of the doors 40, 42 may be located on other floors 28. The car doors 44, 46 may be respectively located on opposite sides of the elevator car 22. Car door 44 may be associated with landing door 40, and car door 46 may be associated with landing door 42. When a passenger enters and exits the elevator car 22 at a specific floor 28, door pairs 40, 44, or door pair 42, 46 must be open. Before the elevator car 22 begins to travel, all doors 40, 42, 44, 46 must be closed. The control configuration 30 may monitor and control all of these events. It is contemplated and understood that a single elevator car 22 may be associated with a single set of doors, three sets of doors, or more.

The landing doors 40, 42 may be located at each landing 28, which barriers the otherwise exposed hoistway 24 for the protection of waiting passengers yet to board the elevator car 22. The doors 44, 46 of the elevator car 22 protect the passengers within the elevator car 22 while the car is moving within the hoistway 24. The monitoring and actuation of all doors 40, 42, 44, 46 may be controlled by the control configuration 30 via, for example, electrical signals (see arrows 48) received from a plurality of sensors 50 (e.g., motion and/or position sensors) with at least one sensor 50 positioned at each door 40, 42, 44, 46. The sensors 50 may be motion and/or position sensors, and may further be an integral part of door actuator assemblies 52 (see FIG. 3) that at least facilitate door opening and closing functions.

Referring to FIGS. 1 and 2, the call panels 32, 34, 36, 38 may be configured for two-way communication via electric signals (see arrows 54) with the control configuration 30. In one example, the call panels 32, 34 may be landing call panels located adjacent to respective landing doors 40, 42 on each floor 28. That is, each landing call panel 32, 34 may be mounted to a wall of the building 26. The call panels 36, 38 may be car call panels located inside the elevator car 22 and, in one example, adjacent to respective car doors 44, 46. Any one or more of the call panels 32, 34, 36, 38 may be an interactive touch screen with the images of each call selection 54 (i.e., interactive floor or area destination selections) displayed on the screen and configured to visually change when selected. Alternatively, any one or more call panels 32, 34, 36, 38 may include mechanical buttons that may be configured to, for example, illuminate when selected. In one alternative embodiment, the elevator system 20 may include landing call panels 32, 34 that provide a selection of desired car travel direction (e.g., up and down directions represented by arrow) and the car call panels 36, 38 may provide, or include, the actual call selection 54 relative to a desired floor destination. It is contemplated and understood that many other configurations and locations of the call panels 32, 34, 36, 38 may be applicable to the present disclosure. It is contemplated and understood that the call panels 32, 34, 36, 38 may include a host of other capabilities and may be programmable and/or may include a processor that may be part of the control configuration 30.

Referring to FIG. 3, the door actuator assemblies 52 of the elevator system 20 may generally include components such as a lower sill 56, a gib 58, a roller 60, a belt 62, an upper track 64, and a door operator 66 that may include an electric motor or may be hydraulically actuated. The components of the door actuator assembly 52 are generally known by one skilled in the art, thus further explanation of physical arrangements and interactions will not be described herein. Moreover, any desired door actuator assembly 52 and components and arrangements thereof may be used. The door operator 66 is configured to receive a command signal (see arrow 58) from the control configuration 30, that may be based, at least in-part, on processing of the sensor signal 48.

Figure 4:
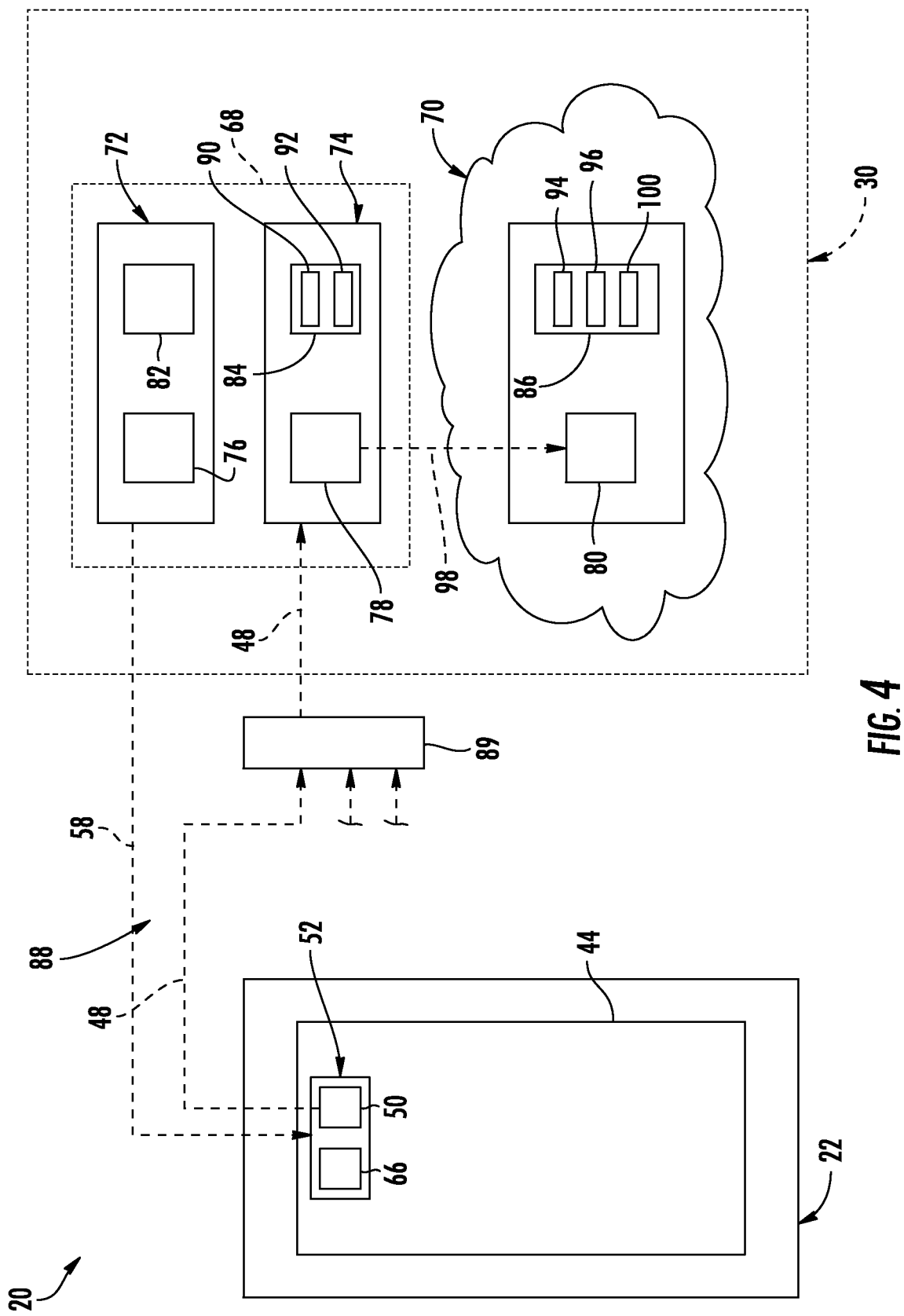
FIG. 4 is a schematic of the elevator system further illustrating a health monitoring system of the elevator system.

Referring to FIG. 4, the control configuration 30 may include a local control arrangement 68, and optionally a controller and/or server 70 that may be remote and cloud-based. The local control arrangement 68 may include at least one controller (i.e., two illustrated as 72, 74. The server 70 and the local controllers 72, 74 may each generally include respective processors 76, 78, 80 and respective electronic storage mediums 82, 84, 86 that may be computer writeable and readable. The first local controller 72 may be configured to generally monitor and control normal operations and functions of the elevator system via receipt of a multitude of sensory inputs (e.g., signal 48) and a multitude of output commands. It is contemplated and understood that the controller 70 may not generally be remote, and instead, may be at least in-part mobile. For example, the controller 70 may include a mobile smart device (e.g., smartphone) that may be carried by a person (e.g., a service technician). In one embodiment, the remote server 70 may be local.

The second local controller 74 and the remote server 70 may be part of a health monitoring system 88 along with, for example, a sensor hub or gateway 89, and the sensor 50 and/or any variety of sensors that may be otherwise dedicated to the health monitoring system. The health monitoring system 88 may be configured to collect data from one or more sensory inputs, via the gateway 89, and during relevant component operations (e.g., car door 44 operations), and process the sensory input data to assess, for example, door health and degradation of various door components. Other sensory inputs may include signals from accelerometer sensors, microphones, image devices, and others. The health monitoring system 88 may also be configured to determine door motion through the existing elevator communication system(s) or additional sensor inputs.

In general, the health monitoring system 88 may be configured to process data in two phases. The first phase may extract relevant features from sensory data, and aggregate and compress the signal. The second phase may apply machine learning to determine degradation level of individual components (e.g., door components). The first phase may be done locally (i.e., on site), and the second phase may be done either remotely (i.e., in the cloud), or locally (e.g., on a service technician's smartphone).

The health monitoring system 88 may further include a feature generation module 90, a fault detection module 92, a fault classification module 94 and a degradation estimation module 96. The modules 90, 92, 94, 96 may be software based, and may be part of a computer software product. In one embodiment, the feature generation module 90 and the fault detection module 92 may be stored locally in the electronic storage medium 94 of the local controller 74 or local control arrangement 68, and executed by the processor 78. In the same embodiment, the fault classification module 94 and the degradation estimation module 96 may be stored in the electronic storage medium 86 of the server 70 and executed by the processor 80.

The feature generation module 90 is configured to extract a predesignated feature from a parameter signal (i.e., signal 48) and from at least one sensor 50. In one example, the sensor 50 may be adapted to at least assist in controlling and/or monitoring door motion as the parameter and generally detect vibration (i.e., amplitude and frequency) as the feature. That is, the feature generation module 90 receives relevant properties of raw signals and applies data reduction techniques producing processed data sent to the fault detection module 92. It is contemplated and understood that the sensor 50 may be dedicated to detect vibration (e.g., an accelerometer) for use by the feature generation module 90. Other examples of a sensor 50 may include a microphone, a velocity sensor, a position sensor, an accelerometer, a pressure sensor, and a current sensor. The microphone may be applied to detect unusual sounds. The velocity sensor may be applied to detect unexpected high or low velocities, the position sensor may be applied to detect an unusual or unexpected position of a component in a given moment in time. The current sensor may be applied to detect unexpected current levels in, for example, an electric motor of the door operator 66.

The fault detection module 92 receives the processed data from the feature generation module 90, analyzes the predesignated feature (e.g., vibration), and extracts feature derivations from the predesignated feature that may be indicative of abnormal operation (e.g., door operation). Such abnormal door operation may be caused by any number of issues including debris in the sill 56, degradation of the rollers 60, tension issues of the belt 62, and others. The processed data associated with the feature derivations may then be sent over a wireless pathway 98 to the cloud-based server 70 for further processing by the fault classification module 94. In one embodiment, the pathway 98 may be wired.

The fault classification module 94 receives the feature derivation data from the fault detection module 92, and classifies the feature derivations into multiple faults. For example, the feature derivation data may contain trait frequencies at trait amplitudes each indicative of a particular fault. One vibration trait characteristic may point toward issues with the sill 56, and another toward issues with the track 64, and yet another toward issues with the belt 62. The processed data associated with the classified feature derivations may then be sent to the degradation estimation module 96.

Figure 5:
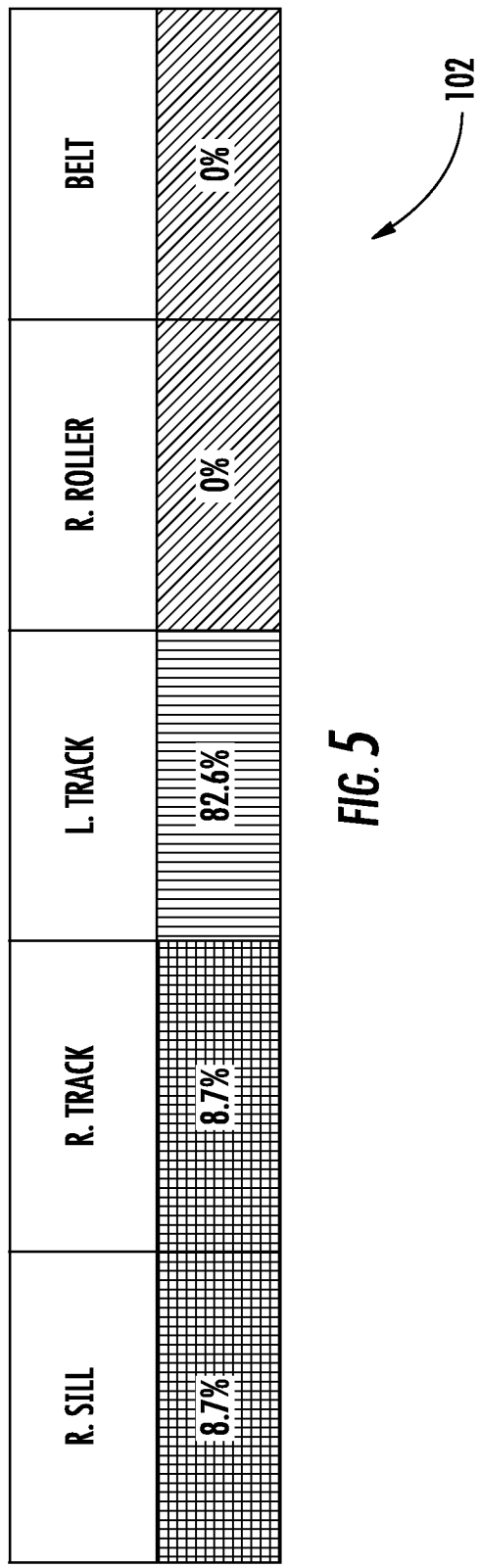
FIG. 5 is a degradation level table produced by the health monitoring system.

Referring to FIGS. 4 and 5, the degradation estimation module 96 may be configured to apply a model 100 stored in the storage medium 86 of the server 70 to the classified feature derivation data to determine where the associated component lies along a degradation model or line. That is, by applying the model 100 the expected remaining life of a component (e.g., door component) and/or the severity of the need for maintenance may be determined. The degradation estimation module 96 may apply machine learning (i.e., algorithms) and/or may include a temporal regression feature, to enhance accuracy of the model 100.

Referring to FIG. 5, one example of a table 102 representing the degradation level of various exemplary components is illustrated. The table 102 may generally be produced by the degradation estimation module 96 utilizing the model 100, and may be sent to any variety of destinations. In one embodiment, a service technician, building owner, service center, or other interested party may receive the table 102. In the present example, the table 102 informs the technician that a right sill has degraded by 8.7%, a right track has degraded by 8.7%, a left track has degraded by 82.6% and requires maintenance, a right roller has not degraded, and a belt has not degraded.

In another embodiment, the modules 90, 92 may be executed by the local controller 74, the modules 94, 96 may be loaded into and executed by a smartphone that may be carried by a service technician, and the model 100 may be stored in a cloud-based server 70 and retrieved by the smartphone.

It is contemplated and understood that application of the health monitoring system 88 and the vandalism monitoring system 104 is not limited to elevator doors, but may include other elevator components such as brakes, drive motors, guide wheels, interior car walls, other structural components, and more. The type of sensor 50 may generally be dependent upon the elevator component being monitored.

The control configuration 30, or portions thereof, may be part of, one or more Application Specific Integrated Circuit (s) (ASIC), electronic circuit(s), central processing unit(s) (e.g., microprocessor and associated memory and storage) executing one or more software or firmware programs and routines, combinational logic circuit(s), input/output circuit (s) and devices, appropriate signal conditioning and buffer circuitry, and other components to provide the described functionality.

Software, modules, applications, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators and other devices The present disclosure may be a system, a method, and/or a computer program product. The computer program product may include a computer readable storage medium (or media) having computer readable program instructions thereon for causing a processor to carry out aspects of the present disclosure.

The computer readable storage medium(s) can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Benefits and advantages of the present disclosure include a health monitoring system 88 that enables automated health monitoring of individual door components for each landing in an elevator system 20. Such monitoring may be used to determine if maintenance is required and on what components. Because the information is available remotely, the information may be used to determine if a site visit is required by a technician or not. Yet further, and locally, the data may provide technicians with information relative to which components require attention and on which landing.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An elevator system comprising:
a component adapted to perform a function;
a sensor configured to detect an operating parameter associated with the function;
a control configuration configured to receive a parameter signal from the sensor; extract a predesignated feature from data associated with the parameter signal, aggregate the predesignated feature, and apply machine learning to determine a degradation level of the function associated with the predesignated feature; and
a car adapted to travel in a hoistway, wherein the component includes a door assembly adapted to open and close for user access into and out of the car from and to a plurality of landings, wherein the door assembly includes a plurality of landing doors and the function is opening and closing of the plurality of landing doors, wherein the sensor is one of a plurality of sensors with each sensor located at a respective landing door of the plurality of landing doors.

2. The elevator system set forth in claim 1, wherein the feature includes vibration.

3. An elevator system comprising:
a component adapted to perform a function;
a sensor configured to detect an operating parameter associated with the function;
a control configuration configured to receive a parameter signal from the sensor; extract a predesignated feature from data associated with the parameter signal, aggregate the predesignated feature, and apply machine learning to determine a degradation level of the function associated with the predesignated feature;
a feature generation module executed by the control configuration for extracting the predesignated feature from the parameter signal;
a fault detection module executed by the control configuration to analyze the predesignated feature and extract feature derivations from the predesignated feature indicative of abnormal operation;
a fault classification module executed by the control configuration to classify the feature derivations into respective fault classes;
a degradation estimation module executed by the control configuration to establish a learned degradation model;
wherein the control configuration includes a local controller and a server, and the local controller is configured to execute the feature generation module and the server is configured to execute the fault classification module and the degradation estimation module;
wherein the server is cloud-based; and
wherein the control configuration includes:
a sensor hub configured to receive the parameter signal;
a mobile device configured to receive the parameter signal from the local controller, execute the feature generation module, execute the fault detection module, execute the fault classification module, and execute the degradation estimation module; and the cloud-based server configured to communicate with the mobile device and store the learned degradation model for use by the degradation estimation module.

* * * * *